United States Patent Office 2,944,923
Patented July 12, 1960

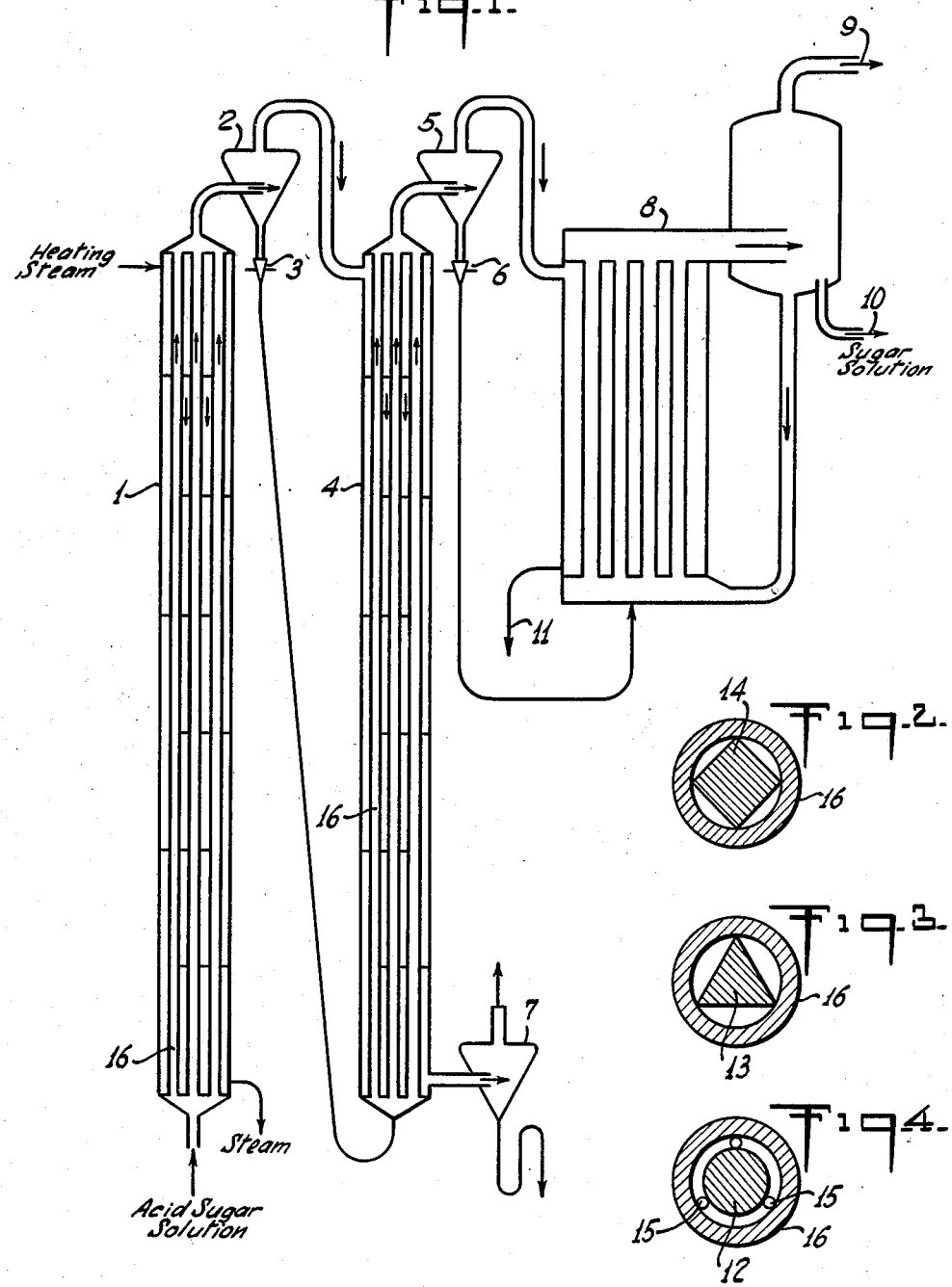

2,944,923

CONCENTRATION OF WOOD SUGAR SOLUTIONS

Theodor Riehm, Mannheim, Germany, assignor to Udic Societe Anonyme, Vevey, Switzerland Filed Jan. 17, 1958, Ser. No. 709,519

Claims priority, application Switzerland Jan. 18, 1957

6 Claims. (Cl. 127—37)

The invention relates to the evaporation and concentration of acid wood sugar solutions.

In the wood hydrolysis with concentrated hydrochloric acid according to the Bergius-Rheinau process, there are obtained sugar solutions in hydrochloric acid, which has to be separated from the sugars and recovered. Heretofore, said hydrochloric acid was evaporated in a single step vacuum distillation at a pressure of about 40 to 50 Torr. and a temperature of about 40 to 50° C. This type of operation requires a relatively large heat supply and increases the cost of the sugar production.

Methods are known to concentrate solutions in several vacuum or alternating pressure and vacuum steps, whereby the effluents of the steps operated at higher pressures and temperatures are used to heat the solution in the steps operated at lower temperatures. In this way, the heat economy of the whole evaporation is improved because external heat has to be supplied only to the first evaporation step. This conventional type of multiple step operation is not suitable for the concentration of acid wood sugar solutions because the sugars are decomposed at the required high temperatures of the first evaporation steps.

It is a principal object to provide a method of evaporating the bulk of the concentrated hydrochloric acid from wood sugar solutions in several steps under conditions where no harmful decomposition of the sugar takes place.

Other objects and advantages will be apparent from a consideration of the specification and claims.

According to the invention, the wood sugar solution is passed in a single passage at atmospheric pressure upwardly through externally heated long narrow evaporator tubes in which it partially evaporates. The generated acid vapor and the liquid pass the tubes within fractions of a second at such speed that no liquid can fall back into the tubes and that substantially no decomposition of the sugars takes place. The evaporation uses the principle of the so-called Mammoth pump as the specific action is due to the difference of the specific weights of the sugar solution and the mixture of sugar solution and hydrochloric acid vapor in the individual tubes. The liquid passes at a rate of 20–40 m./sec. through the evaporator tubes. This acceleration of the liquid particles in the evaporator tubes prevents the formation of sugar decomposition products and their precipitation on the walls of the tubes, which precipitation is responsible for the obnoxious cake deposits in other evaporators.

From the evaporator, the liquid-vapor mixture passes tangentially into a separator, where the solution and vapors are separated in known manner. The solution which contains still hydrochloric acid, is immediately passed through a release valve or throttle into a second evaporator, which is similar to the first evaporator and operated at about 100–250 Torr. Said second evaporator is also passed in a single passage whereby further amounts of acid are evaporated. After separation of the acid vapors, the remaining solution is transferred over a second pressure release valve or throttle into a vacuum stage at 30 to 50 Torr., wherein it is evaporated to the final concentration in a conventional circulation evaporator.

The whole apparatus represents a multiple-effect evaporator where the vapors of the first stage heat the second stage, and the vapors of the second stage heat the third stage; in this way, the entire heat steam requirement is only about one third that of a single-stage evaporation.

It has been found that any length of residence time of the sugar solution in the separator is still more harmful than such residence time in the evaporator tubes because even at low level of the liquid in the separator the safe residence time is exceeded. For this reason, the throttles between the pressure stages are opened sufficiently to ensure that the entire solution passes immediately into the next evaporator, even though this may allow a slight escape of the vapors from the higher to the lower pressure stage.

A particular advantage of the novel evaporation system is that no pumps are required to convey the liquid from stage to stage.

In the conventional one-stage vacuum concentration at 40 to 50° C., the HCl vapors developed from 40–41% hydrochloric acid cannot be precipitated in vacuo without addition of water; they are recovered only as dilute 30% HCl, which has to be concentrated up to 40–41% HCl in a separate heat-consuming operation. It is an additional advantage of the method of the invention that in the first concentration step, in addition to relatively high concentrated condensed acid, gaseous HCl is obtained which can be directly used to obtain 41% HCl without requiring additional heat for evaporation.

Reference is made to the accompanying drawing showing by way of example suitable apparatus to carry out the invention.

In the drawings,

Fig. 1 shows diagrammatically a multiple stage multiple effect evaporator for the concentration of hydrochloric acid-wood sugar solutions;

Figs. 2 to 4 show cross-sections of various evaporator tubes.

In Fig. 1, the reference numeral 1 designates an evaporator operated under atmospheric pressure, which consists, for instance, of graphite tubes of about 3 to 6 m. length and about 8 to 20 mm. inner diameter. The tubes, which may be built up from several individual sections, are heated from the outside with steam of 140–150° C. The acid sugar solution enters the tubes from the bottom and passes therethrough at a rate of 10 to 40 m./sec., which corresponds to a residence time of about .5 to 3 sec. Solution and hydrochloric acid vapors enter the separator 2, which has a temperature of about 100 to 108° C. The thickened sugar solution flows, without formation of a liquid level, at once over the throttle 3 into the bottom of evaporator 4, which has the same construction as on evaporator, but is operated at a pressure of about 100–250 Torr. The solution passes upwardly through the evaporator 4 at the same rate as in evaporator 1 and is heated by the vapors coming from separator 2. Said vapors are at least in part condensed in the evaporator and pass with a temperature of about 60 to 100° C. into the separator 7. If the sugar solution entering evaporator 1 had a concentration of more than 30% HCl, there remain in the separator 7 still uncondensed vapors which are drawn off upwardly whereas an aqueous about 33% HCl solution is siphoned off.

From the evaporator 4, the concentrated sugar solution and the HCl vapors enter with a temperature of about 60 to 80° C. the separator 5 from which the sugar solution flows through the throttle valve 6 into the bottom of evaporator 8, which is heated by the overhead HCl vapors of the separator 5 entering at 11. Said evaporator 8 is a conventional circulating evaporator and operated at about 30 to 50 Torr. and a temperature of about 35 to 50° C. The developed HCl vapors are drawn off at 9 and the concentrated acid-free sugar solution leaves at 10. In said third evaporation stage, the concentrated sugar solution is so viscous as to prevent the use of the long narrow tubes of the evaporators 1 and 4. Tubes of larger diameter have to be employed to which the principle of single passage operation cannot be applied.

To improve the heat economy of the plant, it is of advantage to pass the starting solution before entering into the evaporator 1 in heat exchange with the vapors or condensates leaving the separators 7 and/or 8.

When graphite tubes are used in the evaporators 1, the inner diameter of the vertical tubes should not exceed 15 mm. and the steam temperature should be at least 140° C. to ensure a uniform rapid passage of the solution so as to prevent falling back of individual droplets of the liquid. With wider tubes, the residence times of the liquid may become so long as to produce decomposition of the sugars at the employed high temperatures.

In order to reduce further the residence time of the solution in the evaporator tubes, the inner space of the tubes may be narrowed by providing therein rods 12, 13, 14 of various forms, as illustrated in Figures 2 to 4, which rods should have as little contact as possible with the inner walls, for instance by provision of spacers 15.

The method of the invention has been developed for concentrating the sugar solutions obtained in the prehydrolysis and main hydrolysis of wood with medium concentrated and high concentrated hydrochloric acid, respectively, as for instance described in my application Serial No. 705,515, for Process for the Saccharification of Softwood Sawdust, filed December 27, 1957. In the concentration of the main sugar solutions, which contain essentially glucose and some other sugars, particularly xylose, in minor amounts, substantially no decomposition is observed when the concentration is carried out according to the invention. In the concentration of the particularly sensitive prehydrolysis sugar solutions obtained from hard-wood, which consist essentially of xylose and 30 to 35% HCl, some slight loss of xylose cannot be avoided; such loss does not exceed about .75% per concentration stage. In contrast to sugar syrups obtained from such prehydrolysis solutions in conventional circulating evaporators in a single concentration stage under reduced pressure at about 45° C., the prehydrolysis sugar syrup obtained according to the invention represents a water-clear acid-free liquid which does not require the conventional subsequent expensive purification procedure.

The invention is illustrated by the following examples. It should be understood, however, that the invention is not to be considered as limited to this particular type of solutions to be concentrated.

All parts are given by weight unless specified otherwise.

*Example 1*

12 kg. per hour of a main hydrolysis hardwood sugar solution were pumped into a set of graphite tubes of 3 m. length and 15 mm. inner diameter of the evaporator 1 at atmospheric pressure and heated with steam of a temperature of 150° C. The solution had a concentration of 16.6% of sugars and 33.4% of HCl. The sugars were composed of 90% of glucose, 7% of xylose, 2% of arabinose and 1% of mannose. From the evaporator, 4.2 kg. of HCl vapors containing 58% of HCl were drawn off per hour, and 7.8 kg. of sugar solution containing 26% of sugars passed hourly into the second evaporator 4, where it was heated by the vapors coming from the first evaporator and having a temperature of 107° C.

In the second evaporator 4, which was of the same construction as evaporator 1 and operated at a pressure of 180 Torr., 2.4 kg./hour of vapors containing 29% of HCl were distilled off, and the same amount of vapors, which contained 25% of HCl, was distilled from the evaporator 8, which had a temperature of 40° C. and was operated under a pressure of 45 Torr.

5.4 kg. of sugar solution containing 37% of sugars passed per hour from the evaporator 4 into the evaporator 8, and 3 kg./hour of concentrated 66% sugar solution were withdrawn from evaporator 8.

The temperature in the separators 2 and 7 was 107° C. and 65° C., respectively.

The residence time of the solution in evaporators 1 and 4 each was 1.5 seconds.

The loss of sugars in the entire operation was .1%.

*Example 2*

The same apparatus was used as in Example 1, and the same temperature, flow and pressure conditions were maintained.

12.5 kg./hour of a prehydrolysis pine wood sugar solution were fed into evaporator 1 at atmospheric pressure and heated with steam of a temperature of 150° C. The solution had a sugar concentration of 12% and a hydrochloric acid concentration of 28% of HCl. The sugars consisted of 27% of glucose, 35% of mannose, 5% of galactose, 29% of xylose, and 4% of arabinose.

In said evaporator 1, 4.5 kg./hour of hydrochloric acid containing 40% of HCl were evaporated. 8 kg./hour of sugar solution containing 18.7% of sugars entered evaporator 4.

In evaporator 4, 2.8 kg./hour of vapors containing 26.5% of HCl were distilled off, and 5.2 kg./hour of sugar solution containing 28.7% of sugars were passed into the evaporator 8. From said evaporator 8, 2.7 kg./hour of vapors containing 26% of HCl were drawn off, and 2.5 kg./hour of a 60% sugar solution was recovered. The loss of sugars was .16%. Said loss during concentration of the solutions can be further reduced by passing the solutions not upwardly but downwardly through the evaporators 1 and 4.

I claim:

1. A process for concentrating a sugar solution obtained in the hydrochloric acid saccharification of cellulosic materials comprising passing said solution substantially under atmospheric pressure upwardly at a rate of about 10 to 40 m./sec. through a first set of narrow vertical tubes having a diameter of about 8 to 20 mm. and heated at a temperature of about 100 to 150° C., said rate of flow preventing backflow of said solution into said tubes, separating the generated vapors from the solution, transferring the thus separated solution at substantially the rate of separation, so as to prevent accumulation thereof in the separation zone, continuously substantially without intermediate stoppage into a second set of narrow vertical tubes, heating said second set of tubes with said generated vapors, passing said solution at a pressure of about 100 to 250 Torr. upwardly through said second set of tubes, withdrawing vapors from the solution leaving said second set of tubes, feeding the remaining solution into a circulating evaporator maintained at a pressure of about 30 to 50 Torr., heating said circulating evaporator with said withdrawing vapors, and drawing off concentrated sugar syrup and hydrochloric acid vapors from said circulating evaporator.

2. A process as defined in claim 1 wherein said narrow vertical tubes consist of graphite and have a length of 3 to 6 m.

3. A process as defined in claim 1 comprising providing in said vertical tubes inner rods reducing the free cross section of said tubes.

4. A process for concentrating a sugar solution obtained in the hydrochloric acid saccharification of cellulosic materials comprising passing said solution in separate confined streams having a diameter not substantially exceeding 15 mm. upwardly through a first evaporation zone maintained substantially at atmospheric pressure and at a temperature of about 100 to 150° C. at a rate producing a residence time of about .5 to 3 seconds and preventing backflow of said solution, combining said streams at the head of said first evaporation zone, drawing off the vapors developed in said first evaporation zone, passing the remaining solution in continuous substantially undammed flow into a second evaporation zone maintained at a pressure of about 100 to 250 Torr., heating said second evaporation zone with the vapors of said first evaporation zone at a temperature of about 60 to 80° C., passing the solution in separate confined streams of substantially the same diameter and at substantially the same rate as in said first evaporation zone upwardly through said second separation zone, combining said streams at the head of said second evaporation zone, withdrawing the vapors developed in said second evaporation zone, passing the remaining viscous sugar solution in a third evaporation zone maintained at a pressure of about 30 to 50 Torr., heating said third evaporation zone with the vapors withdrawn from said second evaporation zone, circulating said solution in said third evaporation zone until a sugar concentration of 60 to 75 percent has been obtained, and withdrawing said concentrated sugar solution.

5. A process for concentrating a sugar solution obtained in the hydrochloric acid saccharification of cellulosic materials comprising passing said solution in separate confined streams having a diameter not substantially exceeding 15 mm. through a first evaporation zone maintained substantially at atmospheric pressure and at a temperature of about 100 to 150° C. at a rate producing a residence time of about .5 to 3 seconds, combining said streams, drawing off the vapors developed in said first evaporation zone, passing the remaining solution in continuous flow into a second evaporation zone maintained at a pressure of about 100 to 250 Torr., heating said second evaporation zone with the vapors of said first evaporation zone at a temperature of about 60 to 80° C., passing the solution in separate confined streams of substantially the same diameter and at substantially the same rate as in said first evaporation zone through said second separation zone, combining said streams, withdrawing the vapors developed in said second evaporation zone, passing the remaining viscous sugar solution in a third evaporation zone maintained at a pressure of about 30 to 50 Torr., heating said third evaporation zone with the vapors withdrawn from said second evaporation zone, circulating said solution in said third evaporation zone until a sugar concentration of 60 to 75 percent has been obtained, and withdrawing said concentrated sugar solution.

6. The process defined in claim 5 wherein said solution is passed downwardly through said first and second evaporation zone.

References Cited in the file of this patent
UNITED STATES PATENTS

| | | |
|---|---|---|
| 1,028,738 | Kestner | June 4, 1912 |
| 1,847,589 | Brobeck | Mar. 1, 1932 |

FOREIGN PATENTS

| | | |
|---|---|---|
| 480,610 | Great Britain | Feb. 24, 1938 |